US011225238B2

(12) United States Patent
Lauffer et al.

(10) Patent No.: US 11,225,238 B2
(45) Date of Patent: Jan. 18, 2022

(54) SYSTEM AND METHOD FOR INCREASING REGENERATIVE BRAKING IN A REAR-WHEEL-DRIVE-BASED PLATFORM WITH FOUR-WHEEL-DRIVE CAPABILITY

(71) Applicant: Ford Global Technologies, LLC, Dearborn, MI (US)

(72) Inventors: Scott J. Lauffer, Northville, MI (US); Ashok E. Rodrigues, Farmington Hills, MI (US); Dale Scott Crombez, Livonia, MI (US); Andreas E. Perakes, Canton, MI (US); Filip Tomik, Milford, MI (US); Kevin Kootsillas, Monroe, MI (US); Michael Paul Lindlbauer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 661 days.

(21) Appl. No.: 14/714,687

(22) Filed: May 18, 2015

(65) Prior Publication Data
US 2016/0339779 A1 Nov. 24, 2016

(51) Int. Cl.
*B60W 10/02* (2006.01)
*B60W 10/119* (2012.01)
(Continued)

(52) U.S. Cl.
CPC ............ *B60W 10/02* (2013.01); *B60K 6/387* (2013.01); *B60K 6/48* (2013.01); *B60K 6/52* (2013.01);
(Continued)

(58) Field of Classification Search
CPC . B60K 6/387; B60K 6/48; B60K 6/52; B60K 17/344; B60K 17/3462;
(Continued)

(56) References Cited

U.S. PATENT DOCUMENTS 5,839,084 A * 11/1998 Takasaki ................ B60K 17/35
180/197
6,930,405 B2 * 8/2005 Gunji ...................... B60K 6/52
180/65.1
(Continued)

FOREIGN PATENT DOCUMENTS

CN 102862477 A 1/2013
WO WO 2007025926 A1 * 3/2007 ......... B60K 23/0808

OTHER PUBLICATIONS

Chinese Office Action dated Dec. 20, 2019, for related Chinese Appln. No. 201610329514.0; 7 Pages.

*Primary Examiner* — Minnah L Seoh
*Assistant Examiner* — Maurice L Williams
(74) *Attorney, Agent, or Firm* — Brooks Kushman PC; David Kelley

(57) ABSTRACT

A vehicle includes a power source configured to provide drive torque, a front axle, a rear axle, and a transfer case configured to distribute drive torque from the power source between the front axle and the rear axle. The vehicle additionally includes a clutch arranged between the front axle and the transfer case. The clutch has a disengaged state and an engaged state drivingly coupling the transfer case and the front axle. The vehicle also includes a regenerative braking system configured to, in response to a braking request, provide regenerative braking torque to the rear axle. The vehicle further includes a controller. The controller is configured to, in response to a braking request and the clutch being in the disengaged state, control the clutch to shift into the engaged state to couple the regenerative braking system to the front axle and provide regenerative braking torque to the front axle.

14 Claims, 2 Drawing Sheets

(51) Int. Cl.
| | |
|---|---|
| *B60K 6/48* | (2007.10) |
| *B60K 6/52* | (2007.10) |
| *B60K 6/387* | (2007.10) |
| *B60W 30/18* | (2012.01) |
| *B60W 20/14* | (2016.01) |
| *B60K 23/08* | (2006.01) |
| *B60K 17/344* | (2006.01) |
| *B60W 20/13* | (2016.01) |
| *B60W 30/184* | (2012.01) |
| *B60W 10/14* | (2012.01) |

(52) U.S. Cl.
CPC ............ *B60K 17/344* (2013.01); *B60K 23/08* (2013.01); *B60W 10/119* (2013.01); *B60W 20/13* (2016.01); *B60W 20/14* (2016.01); *B60W 30/18127* (2013.01); *B60K 2006/4825* (2013.01); *B60K 2023/0825* (2013.01); *B60W 10/14* (2013.01); *B60W 30/1843* (2013.01); *B60W 2510/107* (2013.01); *B60W 2510/244* (2013.01); *B60W 2520/10* (2013.01); *B60W 2540/10* (2013.01); *B60W 2540/12* (2013.01); *B60W 2710/021* (2013.01); *B60W 2710/125* (2013.01); *B60W 2720/403* (2013.01); *Y02T 10/62* (2013.01); *Y10S 903/91* (2013.01); *Y10S 903/914* (2013.01); *Y10S 903/916* (2013.01); *Y10S 903/93* (2013.01)

(58) Field of Classification Search
CPC ..... B60K 23/08; B60W 10/02; B60W 10/119; B60W 10/188; B60W 10/192; B60W 20/14; B60W 30/18127
See application file for complete search history.

(56) References Cited

U.S. PATENT DOCUMENTS

| | | | |
|---|---|---|---|
| 7,136,737 B2 * | 11/2006 | Ashizawa | ................ B60L 7/26 303/152 |
| 7,255,185 B2 | 8/2007 | Shimizu | |
| 7,925,411 B2 | 4/2011 | Fuhrer et al. | |
| 8,512,189 B2 | 8/2013 | Holmes et al. | |
| 8,894,542 B2 | 11/2014 | Aoki et al. | |
| 8,924,120 B2 * | 12/2014 | Perkins | .................... B60L 7/18 303/138 |
| 2003/0150685 A1 * | 8/2003 | Iida | ...................... B60W 10/119 192/82 T |
| 2006/0196714 A1 * | 9/2006 | Sugimoto | ............. B60W 20/13 180/242 |
| 2009/0242289 A1 | 10/2009 | Murty | |
| 2012/0234135 A1 | 9/2012 | Oki | |
| 2013/0324359 A1 | 12/2013 | Sasaki et al. | |
| 2014/0121870 A1 | 5/2014 | Lee | |
| 2014/0248993 A1 * | 9/2014 | Dawidziak | ............ B60K 6/105 477/5 |
| 2015/0025720 A1 | 1/2015 | Bae et al. | |

\* cited by examiner

SYSTEM AND METHOD FOR INCREASING REGENERATIVE BRAKING IN A REAR-WHEEL-DRIVE-BASED PLATFORM WITH FOUR-WHEEL-DRIVE CAPABILITY

TECHNICAL FIELD

The present disclosure relates to a drive system for a vehicle having a rear-wheel-drive (RWD)-based drive system with four-wheel-drive (4WD) or all-wheel-drive (AWD) functionality and a regenerative braking system.

BACKGROUND

Two vehicle powertrain configurations predominate the modern passenger vehicle market, rear wheel drive (RWD) and front wheel drive (FWD). With additional hardware, both of these configurations can be configured to direct power to all four wheels. Because traction at any particular wheel may be limited at certain times, the ability to direct power to all four wheels improves mobility. However, the additional hardware introduces additional parasitic losses which increase fuel consumption even in conditions that do not require the additional capability.

In a typical RWD configuration, the engine is oriented longitudinally in the vehicle such that the crankshaft axis is aligned with the direction of vehicle movement. A transmission mounted to the engine drives a rear driveshaft at a speed which may be less than or greater than the speed of the engine crankshaft according to current vehicle requirements. The rear driveshaft is connected to a rear axle that changes the axis of rotation, reduces the rotational speed, and drives left and right rear axle half-shafts while permitting slight speed differences between the half-shafts as the vehicle turns a corner. A RWD configuration may be adapted to also drive the front wheels by adding a transfer case between the transmission and the rear driveshaft. In addition to driving the rear driveshaft, the transfer case drives a front driveshaft that, in turn, drives a front axle. Some transfer cases include a planetary gear set that divides the torque between front and rear driveshafts while allowing slight speed differences. Other transfer cases have an actively controlled on-demand clutch that only drives the front driveshaft in certain conditions, such as when a controller senses loss of traction of the rear wheels.

In a typical FWD configuration, the engine is oriented transversely in the vehicle such that the crankshaft axis is aligned with the axis of wheel rotation. A transmission mounted to the engine drives a front differential at a speed suitable for current vehicle requirements. The front differential is typically integrated into a common housing with the transmission gearbox. The front differential drives left and right front axles while permitting slight speed differences between the axles as the vehicle turns a corner. A FWD configuration is adapted to also drive the rear wheels by adding a power take off unit (PTU) that drives a rear driveshaft at a speed proportional to the speed of the front differential. A rear drive unit (RDU) typically includes an on-demand clutch that, when engaged drives a rear differential that, in turn, drives left and right rear axles.

SUMMARY

A vehicle according to the present disclosure includes a power source configured to provide drive torque, a front axle, a rear axle, and a transfer case configured to distribute drive torque from the power source between the front axle and the rear axle. The vehicle additionally includes a clutch arranged between the front axle and the transfer case. The clutch has an engaged state and a disengaged state. In the engaged state the clutch drivingly couples the transfer case and the front axle. The vehicle also includes a regenerative braking system configured to, in response to a braking request, provide regenerative braking torque to the rear axle. The vehicle further includes a controller. The controller is configured to, in response to a braking request and the clutch being in the disengaged state, control the clutch to shift into the engaged state to couple the regenerative braking system to the front axle and provide regenerative braking torque to the front axle.

In one embodiment, the vehicle additionally includes first and second front wheels arranged on the front axle, and a front differential drivingly coupling the transfer case and the front axle. In such an embodiment, a first disconnect is arranged between the front differential and the first wheel and is configured to, when engaged, drivingly couple the front differential and the first wheel. A second disconnect is arranged between the front differential and the second wheel and is configured to, when engaged, drivingly couple the front differential and the second wheel. In such an embodiment, the controller is further configured to, in response to the braking request and the first and second disconnects being disengaged, control the first and second disconnects to engage.

In an additional embodiment, the regenerative brake comprises an electric machine. A further embodiment includes a battery electrically coupled to the regenerative brake. The battery has an associated state of charge. In such embodiments, the controller is configured to control the clutch to engage in further response to the state of charge being below an associated threshold.

A method of controlling a vehicle according to the present disclosure, where the vehicle has a power source configured to supply drive torque to a rear axle, regenerative brakes configured to apply regenerative braking torque to the rear axle, and a shiftable member configured to selectively drivingly couple the power source to a front axle, includes engaging the shiftable member. The shiftable member is engaged in response to a braking request and the shiftable member being disengaged. Engaging the shiftable member enables regenerative braking torque to be applied to the front axle.

In one embodiment of the method, the shiftable member includes a clutch arranged between a transfer case and a front differential drivingly coupled to the front axle. In such an embodiment, engaging the shiftable member includes controlling the clutch to engage to drivingly couple the transfer case and the front differential.

In another embodiment, the shiftable member includes a clutch arranged between a front wheel and a front differential drivingly coupled to the front axle. In such an embodiment, engaging the shiftable member includes controlling the clutch to engage to drivingly couple the front differential and the front wheel.

In yet another embodiment, the engaging the shiftable member is in response to the braking request exceeding an associated threshold.

A further embodiment additionally includes, in response to the braking request falling below the associated threshold, disengaging the shiftable member.

A vehicle according to the present disclosure includes a front wheel, a rear wheel, and regenerative brakes configured to, in response to a braking request, apply regenerative braking torque to the rear wheel. The vehicle additionally includes a shiftable member configured to selectively couple the regenerative brake to the front wheel to apply regenerative braking torque to the front wheel. The vehicle further includes a controller configured to, in response to a braking request and the shiftable member being disengaged, control the shiftable member to engage.

In one embodiment, the vehicle additionally includes a transfer case arranged between the front wheel and the rear wheel and configured to distribute torque among the front wheel and rear wheel, wherein the shiftable member includes a clutch configured to, when engaged, drivingly couple the transfer case and the front wheel. A first variant of this embodiment has a front differential configured to drive the front wheel and a drive shaft drivingly coupled to the front differential. In the first variant, the clutch is arranged between the transfer case and the drive shaft and is configured to, when engaged, drivingly couple the transfer case and the drive shaft. A second variant has a front differential configured to drive the front wheel and a drive shaft drivingly coupling the front differential and the transfer case. In the second variant, the clutch is arranged between the front differential and the wheel and is configured to, when engaged, drivingly couple the front differential and the wheel.

In additional embodiments, the controller is configured to control the shiftable member to engage in further response to the braking request exceeding an associated threshold and/or in further response to a battery state of charge being below an associated threshold. In a further embodiment, the regenerative brake comprises an electric machine.

Embodiments according to the present disclosure provide a number of advantages. For example, vehicles disclosed herein may recover an increased portion of kinetic energy via regenerative braking relative to known vehicles. This may in turn increase fuel economy and reduce wear and tear on friction brakes.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
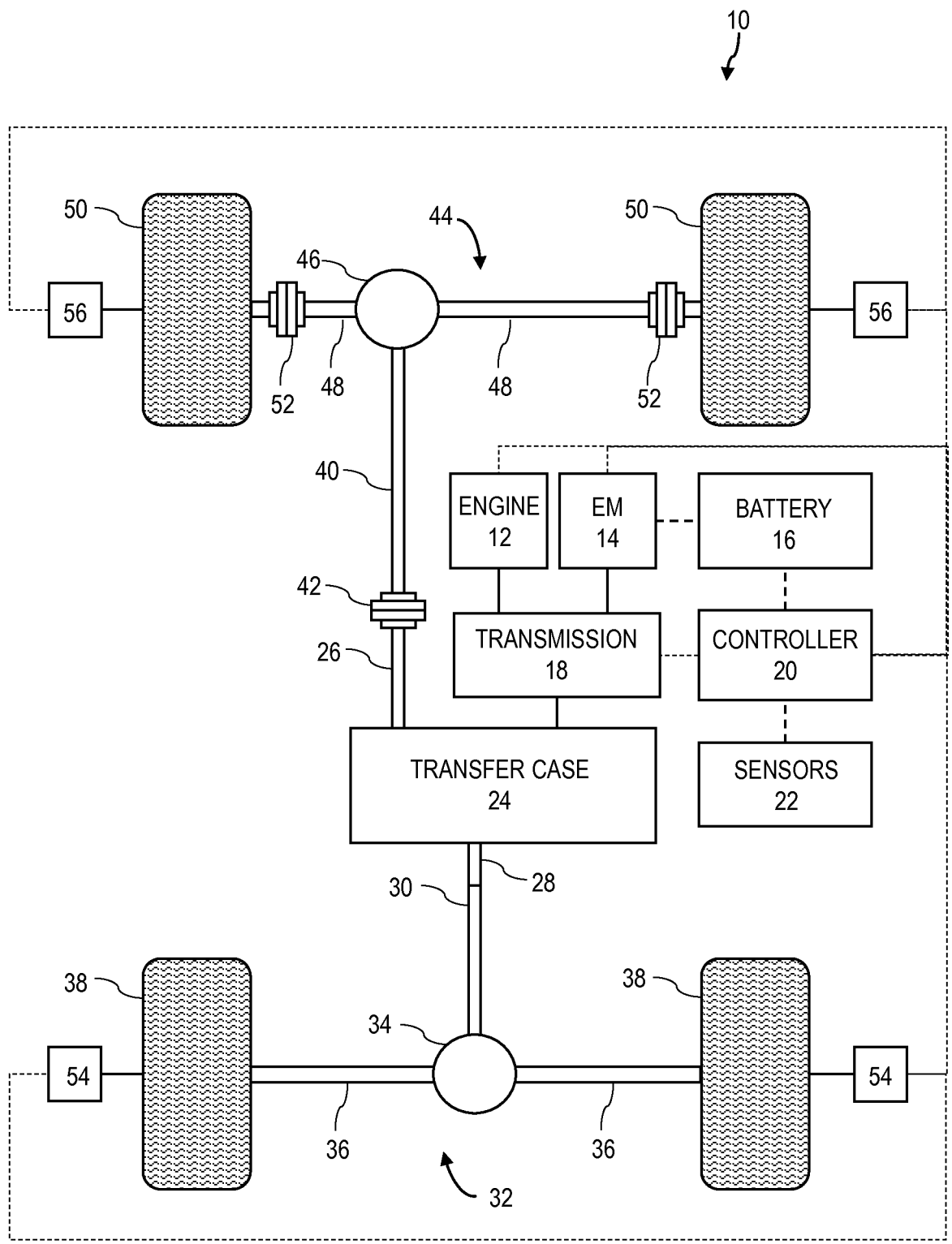
FIG. 1 is a schematic view of a representative vehicle having a RWD-based platform with 4WD functionality according to an embodiment of the present disclosure.

Referring now to FIG. 1, a vehicle 10 according to the present disclosure is shown in schematic form. The vehicle 10 is a hybrid-electric vehicle having a first power source including an internal combustion engine 12 and a second power source including an electric machine 14, which may alternatively be referred to as a motor/generator. The electric machine 14 is electrically coupled to a traction battery 16. When operating as a motor, the electric machine 14 is configured to convert stored electric energy from the traction battery 16 into kinetic energy in the form of drive torque. When operating as a generator, the electric machine 14 is configured to convert kinetic energy into electric energy for storage in the traction battery 16. The vehicle 10 additionally includes a transmission 18, which may in various embodiments include an automatic transmission, a manual transmission, or a continuously-variable transmission (CVT).

The engine 12, electric machine 14, battery 16, and transmission 18 are all in communication with or under the control of at least one controller 20. In addition, a plurality of sensors 22 are in communication with or under the control of the controller 20. The sensors 22 include, but are not limited to, a speedometer, a brake pedal sensor configured to detect a position of a driver-actuated brake pedal, and an accelerator pedal sensor configured to detect a position of a driver-actuated accelerator pedal.

While depicted as a single unit, the controller 20 may include a plurality of distinct control modules that may be used to control multiple vehicle systems according to an overall vehicle control logic, or software. The controller 20 may include an engine control module (ECM), a transmission control module (TCM), a vehicle system controller (VSC), a brake controller, and/or other appropriate controllers. The controller 20 generally includes any number of microprocessors, ASICs, ICs, memory (e.g., FLASH, ROM, RAM, EPROM and/or EEPROM) and software code to co-ordinate the various control modules to perform a series of operations. The controller 20 may also include predetermined data, or "look up tables" that are based on calculations and test data and stored within the memory. The control modules of controller 20 communicate with each other and other vehicle systems over one or more wired or wireless vehicle connections using common bus protocols (e.g., CAN and LIN).

The vehicle 10 is arranged as a primarily RWD platform with 4WD functionality. The transmission 18 drivingly couples the engine 12 and the electric machine 14 to a transfer case 24. The transfer case 24 is configured to distribute torque between a front output shaft 26 and a rear output shaft 28.

The rear output shaft 28 is drivingly coupled to a rear drive shaft 30, which is in turn drivingly coupled to a rear axle 32 via a rear differential 34. The rear axle 32 includes two half-shafts or side-shafts 36, each coupled to a respective rear wheel 38.

The front output shaft 26 is selectively coupled to a front drive shaft 40 by an on-demand clutch 42. When the clutch 42 is engaged, the front output shaft 26 is drivingly coupled to the front drive shaft 40. When the clutch 42 is disengaged, the front drive shaft 40 is decoupled from the front output shaft 26. In an alternative embodiment, the clutch 42 is arranged within the transfer case 24 and configured to, when disengaged, decouple the front output shaft 26 from other components of the transfer case 24.

The front drive shaft 40 is drivingly coupled to a front axle 44 via a front differential 46. The front axle 44 includes two half-shafts or side-shafts 48, each selectively coupled to a respective front wheel 50 by a respective wheel disconnect 52. Each wheel disconnect 52 has an engaged state and a disengaged state. When a wheel disconnect 52 is engaged, the associated half-shaft 48 is drivingly coupled to the associated front wheel 50. When a wheel disconnect 52 is disengaged, the associated half-shaft 48 is decoupled from the associated front wheel 50. The wheel disconnects 52 and clutch 42 are also in communication with or under the control of the controller 20.

The controller 20 may disengage the clutch 42 and/or wheel disconnects 52 to decouple the associated components and operate in a RWD mode. Decoupling the front wheels 50 and/or the front drive shaft 40 reduces parasitic losses by reducing the quantity of driven and/or rotating components. Notably, disengaging the clutch 42 and the wheel disconnects 52 permits the front wheels 50 to rotate freely without requiring the front axle 44, front differential 46, front drive shaft 40 to rotate. In other embodiments, additional components arranged between the clutch 42 and wheel disconnects 52 may also rotate freely. Parasitic losses may thus be reduced in RWD mode, increasing fuel economy.

The controller 20 may engage the clutch 42 and wheel disconnects 52 to drivingly couple the engine 12 and electric machine 14 to the front wheels 50 and operate in a 4WD mode. This mode may provide increased traction and/or stability relative to the RWD mode. The controller 20 may include logic configured to operate in 4WD mode in response to at least one 4WD condition being detected by the sensors 22.

The vehicle 10 additionally includes rear friction brakes 54 configured to apply friction braking torque to the rear wheels 38 and front friction brakes 56 configured to apply friction braking torque to the front wheels 50. The rear friction brakes 54 and front friction brakes 56 are in communication with or under the control of the controller 20. In response to a braking request, as detected, for example, by a brake pedal sensor 22, the controller 20 is configured to coordinate the rear friction brakes 54, front friction brakes 56, and electric machine 14 to provide friction braking torque and regenerative braking torque, respectively to satisfy the braking request.

Previously-known FWD/4WD or RWD/4WD vehicles are generally configured to, when regenerative braking is active, decouple the non-driven axle and reduce parasitic losses while applying regenerative braking torque to the driven axle. Applying braking torque to only the rear axle in a RWD-based system is generally less stable than applying braking torque to both the front and rear wheels. In such systems, friction brakes are therefore generally activated to apply friction braking torque to the non-driven axle. However, during a braking event, dynamic weight shift may result in the majority of vehicle braking being performed at the front wheels. As an example, approximately 70% of braking may occur at the front wheels during a typical braking event. In a RWD-based system, this may result in most braking occurring as friction braking at the front wheels rather than regenerative braking at the rear wheels, restricting the amount of energy that may be captured at the rear axle without inducing vehicle stability. Friction brakes dissipate kinetic energy as heat, thus reducing the maximum amount of kinetic energy that may be recaptured. Consequently, such systems may not recapture the maximum available energy.

Other known systems may include a separate motor/generator for each axle or for each wheel. While such systems permit increased regenerative capacity relative to decoupling the non-driven axle, they also involve increased complexity due to the increased number of components.

Figure 2:
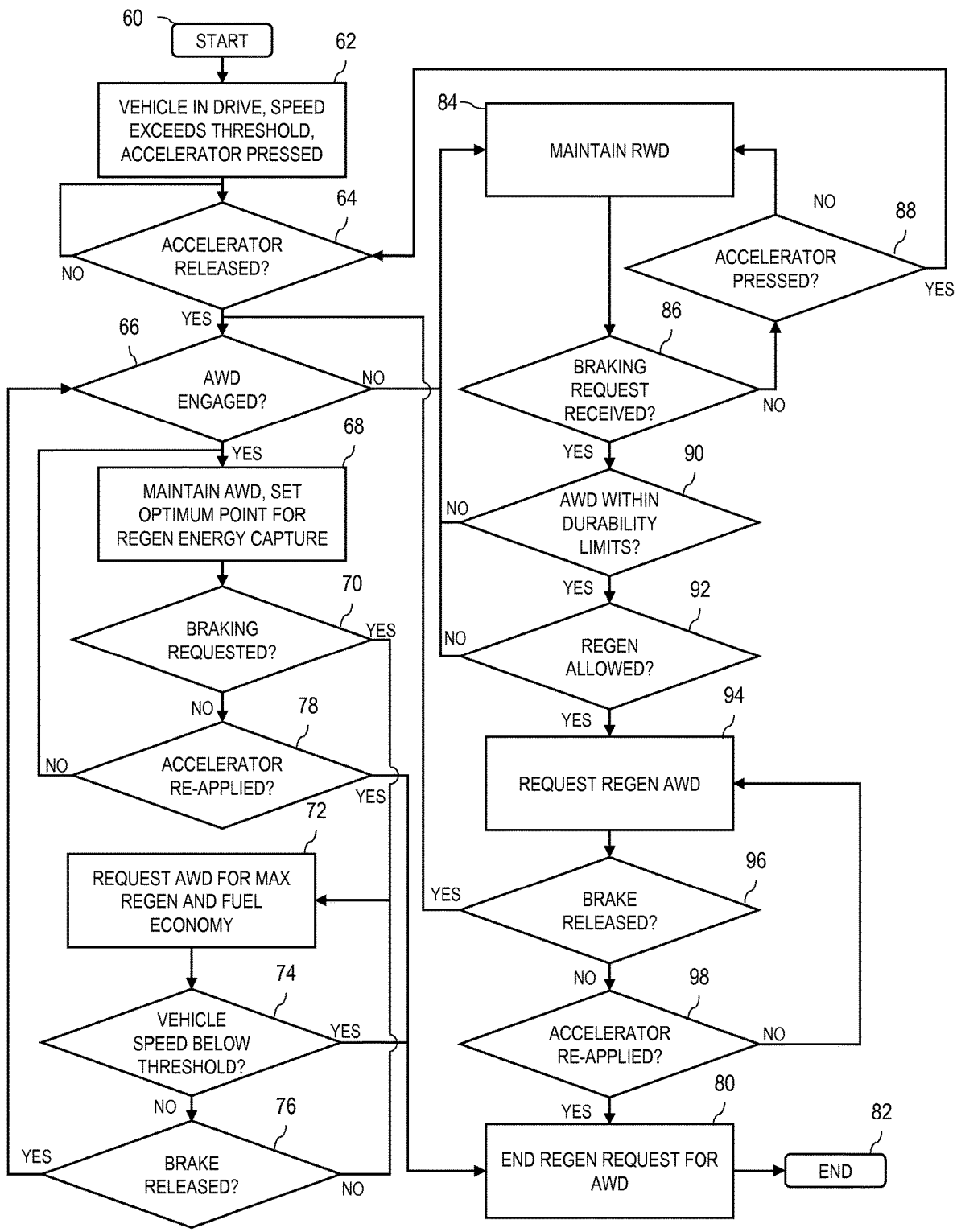
FIG. 2 is a flowchart illustrating a representative method for controlling a vehicle according to an embodiment of the present disclosure.

Referring to FIG. 2, a method of controlling a vehicle according to the present disclosure is illustrated in flowchart form. The algorithm begins at block 60. At block 62, the vehicle is in motion with the transmission 18 in DRIVE, the speed being above an entry threshold, and the accelerator pedal being pressed, as illustrated at 62. The entry threshold may be calibrated based on various factors, including (but not limited to) system parasitic losses, drivability due to binding of the front axle at low speeds, and electric machine torque characteristics over a range of vehicle speeds.

At operation 64, a determination is made of whether the accelerator pedal has been released. If the determination is negative, control remains at operation 64. Thus, the algorithm remains at operation 64 until the accelerator pedal is released. If the determination is positive, control proceeds to operation 66.

At operation 66, a determination is made of whether the vehicle is in 4WD mode, e.g. whether the clutch 42 and disconnects 52 are in the engaged state. If the determination is positive, control proceeds to block 68. At block 68, the vehicle is maintained in 4WD mode, and a quantity of "lift pedal" regenerative braking torque is applied. In addition, the clutch 42 and/or disconnects 52 may be controlled to vary the torque quantity transferred to the front wheels based on factors including, but not limited to, the amount of energy available for capture, regenerative capacity of the electric machine 14 and/or battery 16, vehicle stability conditions, noise, vibration, and harshness (NVH), and drivability. Control then proceeds to operation 70.

A determination is made at operation 70 of whether braking is requested, e.g. whether a brake pedal is pressed. If the determination is positive, control proceeds to block 72. At block 72, an AWD_regen condition is activated. When the AWD_regen condition is active, the vehicle is maintained in 4WD mode and regenerative braking torque and friction braking torque are coordinated to brake the vehicle and recover kinetic energy via regenerative braking. Because the vehicle is in 4WD mode, the electric machine 14 applies regenerative braking torque to both the rear axle 32 and the front axle 44. The controller may also control the friction brakes 54 and 56 to provide friction braking torque if the electric machine 14 is incapable of satisfying the braking request via regenerative braking torque alone. Control then proceeds to operation 74.

At operation 74, a determination is made of whether the vehicle speed has fallen below the entry threshold. If the determination is negative, control proceeds to operation 76.

At operation 76, a determination is made of whether the brake has been released. If the determination is positive, control returns to operation 66. If the determination is negative, control returns to block 72. Thus, the vehicle is maintained in 4WD mode and regenerative braking torque and friction braking torque are applied until the brake is released.

Returning to operation 74, if the determination is positive, control proceeds to block 80. At block 80, the AWD_regen condition ends. While the AWD_regen condition is ended, the vehicle may still be maintained in 4WD mode due to other conditions, such as traction or stability requirements. The algorithm then ends at block 82.

Returning to operation 70, if the determination is negative, control proceeds to operation 78. At operation 78, a determination is made of whether the accelerator pedal has been re-applied. If the determination is negative, control returns to block 68. Thus, the lift pedal regenerative braking torque is applied until braking is requested or the accelerator is re-applied. If the determination is positive, control proceeds to block 80.

Returning to operation 66, if the determination is negative, control proceeds to block 84. At block 84, the vehicle is maintained in RWD mode. Control then proceeds to operation 86.

At operation 86, a determination is made of whether braking is requested, e.g. whether a brake pedal is pressed. If the determination is negative, control proceeds to operation 88.

At operation 88, a determination is made of whether the accelerator has been pressed. If the determination is negative, control returns to block 84. If the determination is positive, control returns to operation 64.

Returning to operation 86, if the determination is positive, control proceeds to operation 90. At operation 90, a determination is made of whether 4WD operation is permissible based on durability factors, such as current temperatures of various 4WD components. If the determination is negative, control returns to block 84. If the determination is positive, control proceeds to operation 92.

At operation 92, a determination is made of whether regenerative braking is permissible. This determination may be made based a variety of factors including, but not limited to, current battery state of charge, battery charging limits, the presence and magnitude of wheel slip, and other stability considerations. If the determination is negative, control returns to block 84. If the determination is positive, control proceeds to block 94.

At block 94, the AWD_regen condition is activated. Consequently, the clutch 42 and disconnects 52 are engaged to operate the vehicle in 4WD mode. In addition, regenerative braking torque and friction braking torque are coordinated to brake the vehicle and recover kinetic energy via regenerative braking. Because the vehicle is in 4WD mode, the electric machine 14 applies regenerative braking torque to both the rear axle 32 and the front axle 44. The controller may also control the friction brakes 54 and 56 to provide friction braking torque if the electric machine 14 is incapable of satisfying the braking request via regenerative braking torque alone. Control then proceeds to operation 96.

At operation 96, a determination is made of whether the brake has been released. If the determination is positive, control returns to operation 66. If the determination is negative, control proceeds to operation 98. At operation 98, a determination is made of whether the accelerator pedal has been re-applied. If the determination is positive, control proceeds to block 80. If the determination is negative, control returns to block 94.

While the above has been discussed in conjunction with a selectable RWD/4WD platform, other embodiments may be implemented in conjunction with a selectable AWD platform, or a platform wherein the front axle is the primary driven axle.

In an additional embodiment, the wheel disconnects 52 are omitted. In such an embodiment, only the clutch 42 is engaged to active 4WD mode. In another embodiment, only one wheel disconnect 52 is provided at the differential 46. In such an embodiment, disconnecting one front wheel permits high-drag components of the differential 46 to stop spinning.

In yet another embodiment, a calibratable braking threshold is provided, and operations 70 and 96 are satisfied only when the braking request exceeds the calibratable threshold. Thus, light braking requests may be satisfied by application of regenerative braking torque to only the rear axle 32, while higher magnitude braking requests may be satisfied in AWD mode. The threshold may be calibrated to avoid slippage of the rear wheels.

In a further embodiment, a determination may be made at various points in the control logic of whether binding is occurring. If the determination is positive, AWD mode may be reduced or discontinued until the binding ceases.

As may be seen from the various embodiments, the present invention provides a system and method wherein regenerative braking torque may be applied to both front and rear axles during a braking event. This may increase the portion of kinetic energy recovered via regenerative braking relative to known vehicles, and consequently increase fuel economy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a power source configured to provide drive torque;
   a front axle;
   first and second wheels arranged on the front axle;
   a rear axle;
   a transfer case configured to distribute drive torque from the power source between the front axle and the rear axle;
   a front differential drivingly coupling the transfer case and the front axle;
   a first disconnect arranged between the front differential and the first wheel configured to drivingly couple the front differential and the first wheel when engaged;
   a second disconnect arranged between the front differential and the second wheel and configured to drivingly couple the front differential and the second wheel when engaged;
   a clutch arranged between the front axle and the transfer case, the clutch having an engaged state and a disengaged state, wherein in the engaged state the clutch drivingly couples the transfer case and the front axle;
   a regenerative braking system configured to, in response to a braking request, provide regenerative braking torque to the rear axle; and
   a controller configured to, in response to the braking request exceeding a corresponding threshold and the clutch being in the disengaged state, control the clutch to shift into the engaged state to couple the regenerative braking system to the front axle and control the first and second disconnects to engage to provide regenerative braking torque to the front axle, and to control at least one of the clutch and the first and second disconnects to disengage in response to the braking request not exceeding the corresponding threshold.

2. The vehicle of claim 1, further comprising a battery electrically coupled to the regenerative braking system and having a state of charge, wherein the controller is configured to control the clutch to engage in further response to the state of charge being below an associated threshold.

3. The vehicle of claim 1, wherein the regenerative braking system comprises an electric machine.

4. A method of controlling a vehicle having a power source configured to supply drive torque to a rear axle, a regenerative braking system configured to apply regenerative braking torque to the rear axle, and a shiftable member configured to selectively drivingly couple the power source to a front axle, the method comprising:

in response to a braking request exceeding a threshold, temperature of at least one powertrain component satisfying a predetermined durability requirement, and the shiftable member being disengaged, engaging the shiftable member to apply regenerative braking torque to the front axle.

5. The method of claim 4, wherein the shiftable member includes a clutch arranged between a transfer case and a front differential drivingly coupled to the front axle, and wherein engaging the shiftable member includes controlling the clutch to engage to drivingly couple the transfer case and the front differential.

6. The method of claim 4, wherein the shiftable member includes a clutch arranged between a front wheel and a front differential drivingly coupled to the front axle, and wherein engaging the shiftable member includes controlling the clutch to engage to drivingly couple the front differential and the front wheel.

7. The method of claim 4, wherein the engaging the shiftable member is in response to the braking request exceeding an associated threshold.

8. The method of claim 7, further comprising, in response to the braking request falling below the associated threshold, disengaging the shiftable member.

9. A vehicle comprising:
front and rear wheels
regenerative brakes configured to, in response to a braking request, apply regenerative braking torque to the rear wheels;
a shiftable member configured to selectively couple the regenerative brakes to the front wheels; and
a controller configured to, in response to a braking request exceeding a threshold, temperature of the shiftable member satisfying a predetermined durability requirement, and the shiftable member being disengaged, control the shiftable member to engage.

10. The vehicle of claim 9, further comprising a transfer case arranged between the front wheel and the rear wheel and configured to distribute torque among the front wheel and rear wheel, wherein the shiftable member includes a clutch configured to, when engaged, drivingly couple the transfer case and the front wheel.

11. The vehicle of claim 10, further comprising a front differential configured to drive the front wheel and a drive shaft drivingly coupled to the front differential, wherein the clutch is arranged between the transfer case and the drive shaft and configured to, when engaged, drivingly couple the transfer case and the drive shaft.

12. The vehicle of claim 10, further comprising a front differential configured to drive the front wheel and a drive shaft drivingly coupling the front differential and the transfer case, wherein the clutch is arranged between the front differential and the wheel and configured to, when engaged, drivingly couple the front differential and the wheel.

13. The vehicle of claim 9, wherein the controller is configured to control the shiftable member to engage in further response to a battery state of charge being below an associated threshold.

14. The vehicle of claim 9, wherein the regenerative brakes comprise an electric machine.

* * * * *